(12) United States Patent
Hunt et al.

(10) Patent No.: US 11,807,795 B2
(45) Date of Patent: Nov. 7, 2023

(54) OPTICAL DEVICE WITH ANTISTATIC COATING

(71) Applicant: 3M INNOVATIVE PROPERTIES COMPANY, St. Paul, MN (US)

(72) Inventors: Bryan V. Hunt, Nowthen, MN (US); Brandt K. Carter, Woodbury, MN (US); Maureen C. Nelson, West St. Paul, MN (US); Thomas P. Klun, Lakeland, MN (US); Jason S. Petaja, Cottage Grove, MN (US); Yizhong Wang, Woodbury, MN (US); Joel D. Oxman, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/804,726

(22) Filed: May 31, 2022

(65) Prior Publication Data

US 2022/0290022 A1    Sep. 15, 2022

Related U.S. Application Data

(63) Continuation of application No. 13/392,700, filed as application No. PCT/US2010/047005 on Aug. 27, 2010, now abandoned.
(Continued)

(51) Int. Cl.
| C08F 220/34 | (2006.01) |
| C09K 3/16 | (2006.01) |
| C08F 222/10 | (2006.01) |

(52) U.S. Cl.
CPC .............. *C09K 3/16* (2013.01); *C08F 220/34* (2013.01); *C08F 222/104* (2020.02);
(Continued)

(58) Field of Classification Search
CPC .. C08F 220/34; C08F 222/104; C08F 230/08; C09K 3/16; Y10T 428/31663
See application file for complete search history.

(56) References Cited

U.S. PATENT DOCUMENTS

| 3,250,808 A | 5/1966 | Moore, Jr. et al. |
| 4,215,028 A | 7/1980 | Mizuguchi et al. |

(Continued)

FOREIGN PATENT DOCUMENTS

| EP | 1116769 B1 | 12/2011 |
| EP | 2067797 B1 | 11/2020 |

(Continued)

OTHER PUBLICATIONS

Machine translation of JP2009173925 A, retrieved Sep. 26, 2022. (Year: 2009).*

(Continued)

*Primary Examiner* — Callie E Shosho
*Assistant Examiner* — Krupa Shukla
(74) *Attorney, Agent, or Firm* — Jeffrey M. Olofson

(57) ABSTRACT

Optical devices comprising at least one optical layer and at least one antistatic layer disposed on at least one surface of the optical layer wherein the antistatic layer comprises the reaction product of: (a) at least one polymerizable onium salt; and (b) at least one polymerizable, non-onium, silicone or perfluoropolyether moiety-containing monomer, oligomer, or polymer.

2 Claims, 1 Drawing Sheet

Related U.S. Application Data

(60) Provisional application No. 61/237,992, filed on Aug. 28, 2009.

(52) U.S. Cl.
CPC .. *Y10T 428/3154* (2015.04); *Y10T 428/31544* (2015.04); *Y10T 428/31663* (2015.04)

(56) References Cited

U.S. PATENT DOCUMENTS

| | | |
|---|---|---|
| 4,262,072 A | 4/1981 | Wendling et al. |
| 4,980,425 A | 12/1990 | Uhrig et al. |
| 5,161,041 A | 11/1992 | Abileah et al. |
| 5,175,030 A | 12/1992 | Lu et al. |
| 5,183,597 A | 2/1993 | Lu |
| 5,427,835 A | 6/1995 | Morrison et al. |
| 5,496,496 A | 3/1996 | Kajita et al. |
| 5,534,322 A | 7/1996 | Ueyama et al. |
| 5,626,654 A | 5/1997 | Breton et al. |
| 5,771,328 A | 6/1998 | Wortman et al. |
| 5,783,120 A | 7/1998 | Ouderkirk et al. |
| 5,788,749 A | 8/1998 | Breton et al. |
| 5,825,543 A | 10/1998 | Ouderkirk et al. |
| 5,828,488 A | 10/1998 | Ouderkirk et al. |
| 5,882,774 A | 3/1999 | Jonza et al. |
| 5,919,551 A | 7/1999 | Cobb, Jr. et al. |
| 6,017,974 A | 1/2000 | Hosokawa et al. |
| 6,096,925 A | 8/2000 | Lee et al. |
| 6,111,696 A | 8/2000 | Allen et al. |
| 6,277,471 B1 | 8/2001 | Tang |
| 6,280,063 B1 | 8/2001 | Fong et al. |
| 6,354,709 B1 | 3/2002 | Campbell et al. |
| 6,577,358 B1 | 6/2003 | Arakawa et al. |
| 6,740,413 B2 | 5/2004 | Klun et al. |
| 6,750,352 B2 | 6/2004 | Ono et al. |
| 6,759,113 B1 | 7/2004 | Tang |
| 7,074,463 B2 | 7/2006 | Jones et al. |
| 7,269,327 B2 | 9/2007 | Tang |
| 7,269,328 B2 | 9/2007 | Tang |
| 7,345,137 B2 | 3/2008 | Hebrink et al. |
| 7,939,562 B2 | 5/2011 | Grinberg et al. |
| 8,324,143 B2 | 12/2012 | Suzuki et al. |
| 8,742,047 B2 | 6/2014 | Lewandowski et al. |
| 8,816,029 B2 | 8/2014 | Wang et al. |
| 8,853,338 B2 | 10/2014 | Wang et al. |
| 2002/0057564 A1 | 5/2002 | Campbell et al. |
| 2002/0137825 A1 | 9/2002 | Lamanna et al. |
| 2003/0089520 A1 | 5/2003 | Ooyabu et al. |
| 2003/0129421 A1 | 7/2003 | Terauchi et al. |
| 2006/0067638 A1 | 3/2006 | Chang et al. |
| 2006/0182896 A1 | 8/2006 | Murakami et al. |
| 2006/0216500 A1 | 9/2006 | Klun et al. |
| 2008/0124555 A1 | 5/2008 | Klun et al. |
| 2009/0017256 A1 | 1/2009 | Hunt et al. |
| 2009/0142562 A1 | 6/2009 | Miyagawa et al. |
| 2009/0207492 A1 | 8/2009 | Horio et al. |
| 2011/0021691 A1 | 1/2011 | Chiang |
| 2012/0231346 A1 | 9/2012 | Tsujii et al. |

FOREIGN PATENT DOCUMENTS

| | | |
|---|---|---|
| JP | 05098049 A | 4/1993 |
| JP | 05163317 A | 6/1993 |
| JP | 06128501 A | 5/1994 |
| JP | 06136355 A | 5/1994 |
| JP | 06180859 A | 6/1994 |
| JP | 07041528 A2 | 2/1995 |
| JP | 08208274 A | 8/1996 |
| JP | 09268260 A | 10/1997 |
| JP | 10279833 A | 10/1998 |
| JP | 11278582 A | 10/1999 |
| JP | 2002105058 A | 4/2002 |
| JP | 2003152383 A | 5/2003 |
| JP | 2004006232 A | 1/2004 |
| JP | 2006519164 A | 8/2006 |
| JP | 2006236933 A | 9/2006 |
| JP | 2006282877 A | 10/2006 |
| JP | 2006327624 A | 12/2006 |
| JP | 2007112722 4 | 5/2007 |
| JP | 2007320093 A | 12/2007 |
| JP | 2008255224 A | 10/2008 |
| JP | 2008285670 A | 11/2008 |
| JP | 2009066986 A | 4/2009 |
| JP | 2009173925 A | 8/2009 |
| JP | 2009179671 A | 8/2009 |
| JP | 2009209219 A | 9/2009 |
| JP | 2009227949 A | 10/2009 |
| JP | 2009263627 A | 11/2009 |
| WO | 1997005182 A1 | 2/1997 |
| WO | 2002055011 A2 | 7/2002 |
| WO | 2006053083 A2 | 5/2006 |
| WO | 2009029438 A1 | 3/2009 |
| WO | 2011031442 A2 | 3/2011 |

OTHER PUBLICATIONS

Akimoto, "Polymeric Model Membranes", Angewandte Chemie, 1981, vol. 93, No. 1, pp. 108-109.

Diao, "High Performance Cross-Linked Poly(2-acrylamido-2-methylpropanesulfonic acid)-Based Proton Exchange Membranes for Fuel Cells", Macromolecules, Jul. 2010, vol. 43, pp. 6398-6405.

Friberg, "Polyelectrolyte Synthesis in a Lamellar Liquid Crystal", Berichte der Bunsengesellschaft für physikalische Chemie, 1996, vol. 100, No. 6, pp. 1083-1086.

Friberg, "Copolymerization in a Non-Aqueous Lyotropic Liquid Crystal", Journal of Dispersion Science and Technology, 1993, vol. 14, No. 2, pp. 205-235.

Friberg, "Molecular Location in a Nonaqueous Lyotropic Liquid Crystal Polymer", Journal of Polymer Science: Part A: Polymer Chemistry, 1990, vol. 28, pp. 3575-3585.

Guo, "Synthesis of Surface-Functionalized, Probe-Containing, Polymerized Vesicles Derived from Ammonium Bromide Surfactants", Langmuir, 1992, pp. 815-823.

International Search Report for PCT/US2010/047005, dated Nov. 3, 2010, 4 pages.

Kapakoglou, "Coacervation of Surface-Functionalized Polymerized Vesicles Derived from Ammonium Bromide Surfactants. Application to the Selective Speciation of Chromium in Environmental Samples", Analytical Chemistry, 2008, vol. 80, No. 24, pp. 9787-9796.

Mosmuller, "Lipase Activity in Vesicular System: Characterization of Candida cylindracea Lipase and Its Activity in Polymerizable Dialkylammonium Surfactant Vesicles", Biotechnology and Bioengineering, 1993, vol. 42, pp. 196-204.

Ohno, "Development of New Class of Ion Conductive Polymers Based on Ionic Liquids", Electrochimica Acta, Nov. 2004, vol. 50, No. 2-3, pp. 254-260.

Ruckenstein, "Binding Catalytic Sites to the Surface of Porous Polymers and Some Catalytic Applications", Chemistry of Materials, 1992, vol. 4, pp. 122-127.

Tan, "Photopolymerization and Characteristics of Reactive Organoclay-Polyurethane Nanocomposites", Polymer Composites, 2009, pp. 612-618.

Tundo, "Functionally Polymerized Surfactant Vesicles, Synthesis and Characterization", Journal of the American Chemical Society, 1982, vol. 104, pp. 456-461.

* cited by examiner

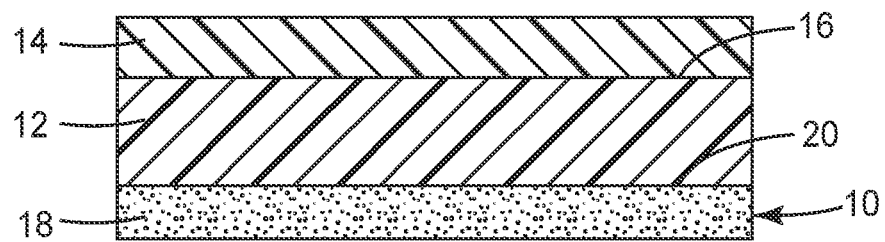

OPTICAL DEVICE WITH ANTISTATIC COATING

FIELD

The present invention relates to optical devices with antistatic coatings.

BACKGROUND

Various optical devices, e.g., employing structured surface films, microsphere layers, or multilayer optical constructions, to manage and alter light transmission are known.

Such devices are commonly used as or in assemblies to increase the sharpness of images produced by displays and to reduce the power consumption necessary to produce a selected brightness. Such assemblies are commonly used in such equipment as computers, televisions, video recorders, mobile communication devices, and vehicle instrument displays, etc.

Illustrative examples of brightness enhancement films and optical assemblies comprising such films are disclosed in U.S. Pat. No. 5,161,041 (Abileah), U.S. Pat. No. 5,771,328 (Wortman et al.), U.S. Pat. No. 5,828,488 (Ouderkirk et al.), U.S. Pat. No. 5,919,551 (Cobb et al.), U.S. Pat. No. 6,277,471 (Tang), U.S. Pat. No. 6,280,063 (Fong), U.S. Pat. No. 6,354,709 (Campbell, et al), U.S. Pat. No. 6,759,113 (Tang), U.S. Pat. No. 7,269,327 (Tang), U.S. Pat. No. 7,269,328 (Tang), and U.S. Patent Appln. Publn. No. 2002/0057564 (Campbell et al.).

Optical devices or assemblies are typically assembled by laminating or joining in desired arrangement two or more layers or films that were separately acquired or manufactured. In the course of handling and joining such films, e.g., removing temporary liners, packaging, placing in desired position, etc. static electrical charges may be created. Such charges may interfere with handling properties of the films, e.g., causing them to undesirably cling together, cause dirt to be entrapped in the construction, etc. Accordingly, it is typically desirable to take steps to prevent the creation and buildup of static electricity in the optical construction.

For example, it has been known to deposit thin film metal layers on optical films. However, it is difficult to provide the necessary metal film on complex surfaces (e.g., many optical film constructions having surfaces made up of concave and convex features) and to do so without undesirably impairing optical performance of the construction and depending upon the construction such films may undesirably impact optical properties of the assembly. U.S. Pat. No. 6,577,358 (Arakawa et al.) discloses the incorporation of a resin layer containing conductive fine particles in an optical construction. The conductive particles in such constructions are likely to impart undesirable absorbance and/or haze, thereby impairing the optical performance of the construction.

The need exists for improved constructions that exhibit excellent antistatic properties and optical performance.

SUMMARY

The present invention provides improved optical devices, e.g., reflective polarizers or brightness enhancement films, with excellent antistatic and other performance characteristics.

Briefly summarizing, optical devices of the invention comprise at least one optical layer and at least one antistatic layer disposed on at least one surface of the optical layer wherein said antistatic layer comprises the reaction product of: (a) at least one polymerizable onium salt; and (b) at least one polymerizable, non-onium, silicone or perfluoropolyether moiety-containing monomer, oligomer, or polymer. Applicants have discovered surprising synergistic performance using such materials.

Polymerizable onium salts, e.g., in the form of ionic liquids, are easily added to impart a polymerizable coating with additional functionality, such as a UV curable matte coating, providing antistatic properties without needing an extra layer. Use of non-onium polymerizable silicone or perfluoropolyether monomers, oligomers, or polymers as described herein has been surprisingly found to enable the addition of higher $T_g$ acrylate materials, which would otherwise reduce the antistatic properties of the resultant coating. Polymerizable silicones or perfluoropolyethers can provide improved coatability and scratch resistance, in addition to synergistically improving the antistatic properties of a polymerizable ionic liquid coating. In addition, the coatings provided herein can yield a durable layer imparting a surface haze, matte surface to the resultant optical device.

In addition to surprising antistatic performance, other advantages of the present invention include that antistat layers of the invention (1) adhere well to a variety of optical films; (2) can be durable so as to withstand handling and manipulation as the optical device is used, e.g., to manufacture a display device; (3) are non-fugitive in character; (4) are clear and colorless; and (5) exhibit low surface energy, making them well suited for various light management purposes as they can be used as is or have additional agents imparted therein to provide color selection, haze, or other desired effect.

BRIEF DESCRIPTION OF THE DRAWING

The invention is further explained with reference to the drawing wherein:

FIG. 1 is a cross sectional view of an illustrative embodiment of the invention.

This FIGURE is not to scale and intended to be merely illustrative and not limiting.

DETAILED DESCRIPTION OF ILLUSTRATIVE EMBODIMENTS

All amounts are expressed in wt. % unless otherwise indicated. All numerical quantities expressed herein are understood to be preceded by the modifier "about" or "approximately".

The optical films of this invention are static dissipative and will dissipate in less than 10 seconds 90% of an electrostatic charge applied to the front surface under a field of 5 kilovolts, preferably in less then 5 sec, more preferably in less than 2 sec, even more preferably in less than 1 sec, and most preferably in less than 0.1 sec. The test used is described in the experimental section.

In view of this strong static dissipative performance and the other advantageous properties of the antistatic layer, the invention can be used to make a variety of optical constructions. An illustrative embodiment of the invention is shown in FIG. 1 wherein optical construction 10 comprises optical film 12 and antistatic layer 14 on surface 16 thereof and optional adhesive 18 on opposite side 20.

Optical Films

Optical films for use in optical constructions of the present invention can be readily selected by those skilled in the art with the selection based in large part upon the optical effect, i.e., light management properties, desired. Optical films used herein could be monolayer members, e.g., substantially flat sheet of polyester sometimes referred to as a polyester base film, or multilayer assemblies comprising intricately formed component features that provide more specialized optical performance. Illustrative examples of optical films that can be used herein can be selected from the group consisting of optical base films, multilayer optical films, diffuse reflecting polarizer films, prismatic brightness enhancement films, arrays of prismatic optical features, arrays of lenticular optical features, and beaded gain diffuser films.

In some embodiments, the optical film in a device of the invention will be selected from the group consisting of reflective polarizers (e.g., so-called multilayer optical films or "MOFs" having regularly repeating layers of alternating refractive indices), brightness enhancement films, and diffuse reflecting polarizer films (sometimes referred to as "DRPFs" having multiphase structures with domains of alternating refractive indices). One illustrative example of a reflective polarizer is VIKUITI™ Dual Brightness Enhancement Film II (DBEF-II), commercially available from 3M, and described in U.S. Pat. No. 7,345,137 (Hebrink et al.). Suitable prismatic brightness enhancement films (sometimes referred to as "BEFs"), also commercially available from 3M, are described in, e.g., U.S. Pat. No. 5,771,328 (Wortman et al.), U.S. Pat. No. 6,280,063 (Fong), and U.S. Pat. No. 6,354,709 (Campbell et al.) and U.S. Patent Appln. Publn. No. 20090017256 (Hunt et al.). Illustrative examples of diffuse reflecting polarizer films that can be used herein include those disclosed in U.S. Pat. No. 5,825,543 (Ouderkirk et al.). Illustrative examples of commercially available optical films suitable for use herein include VIKUITI™ Dual Brightness Enhanced Film (DBEF), VIKUITI™ Brightness Enhanced Film (BEF), VIKUITI™ Diffuse Reflective Polarizer Film (DRPF), VIKUITI™ Enhanced Specular Reflector (ESR), and VIKUITI™ Advanced Polarizing Film (APF), all available from 3M Company.

As described in U.S. Pat. No. 5,175,030 (Lu et al.), and U.S. Pat. No. 5,183,597 (Lu), a microstructure-bearing article (e.g., brightness enhancing film) can be prepared by a method including the steps of: (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a PET film) and the master, at least one of which is flexible; and (d) curing the composition to yield an array of microstructured optical elements on the base. The master can be metallic, such as nickel, nickel-plated copper or brass, or can be a thermoplastic material that is stable under the polymerization conditions, and that preferably has a surface energy that allows clean removal of the polymerized material from the master.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, polyimides, and glass. Optionally, the base material can contain mixtures or combinations of these materials. Further, the base may be multi-layered or may contain a dispersed component suspended or dispersed in a continuous phase.

For some microstructure-bearing products such as brightness enhancement films, examples of preferred base materials include polyethylene terephthalate (PET) and polycarbonate. Examples of useful PET films include photograde polyethylene terephthalate and MELINEX™ PET available from DuPont Teijin Films of Hopewell, Virginia.

Some base materials can be optically active, and can act as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a polarizing film can be prepared from microtine layers of different materials. The materials within the film can be aligned into a polarizing orientation, for example, by employing methods such as stretching the film, applying electric or magnetic fields, and coating techniques.

Examples of polarizing films include those described in U.S. Pat. No. 5,825,543 (Ouderkirk et al.) and U.S. Pat. No. 5,783,120 (Ouderkirk et al.). The use of these polarizer films in combination with a brightness enhancement film has been described in U.S. Pat. No. 6,111,696 (Allen et al.). Another example of a polarizing film that can be used as a base are those films described in U.S. Pat. No. 5,882,774 (Jonza et al.).

Useful substrates include commercially available optical films marketed as VIKUITI™ Dual Brightness Enhanced Film (DBEF), VIKUITI™ Brightness Enhanced Film (BEF), VIKUITI™ Diffuse Reflective Polarizer Film (DRPF), VIKUITI™ Enhanced Specular Reflector (ESR), and VIKUITI™ Advanced Polarizing Film (APF), all available from 3M Company.

One or more of the surfaces of the base film material can optionally be primed or otherwise be treated to promote adhesion of the optical layer to the base. Primers particularly suitable for polyester base film layers include sulfopolyester primers, such as described in U.S. Pat. No. 5,427,835 (Morrison et al.). The thickness of the primer layer is typically at least about 20 nm and generally no greater than about 300 nm to about 400 nm.

The optical elements can have any of a number of useful patterns. These include regular or irregular prismatic patterns, which can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retroreflecting film or element for use as reflecting film. Another useful microstructure is a prismatic pattern that can act as an optical turning film or element for use in an optical display.

One preferred optical film having a polymerized microstructured surface is a brightness enhancing film. Brightness enhancing films generally enhance on-axis luminance (referred herein as "brightness") of a lighting device. The microstructured topography can be a plurality of prisms on the film surface such that the films can be used to redirect light through reflection and refraction. The height of the prisms typically ranges from about 1 to about 75 microns though it will be understood that features having heights outside this range may, of course, be used. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The microstructured optical elements of a brightness enhancing film generally comprises a plurality of parallel longitudinal ridges extending along a length or width of the film. These ridges can be formed from a plurality of prism apexes. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from about 70° to about 120° and may range from about 80° to about 100°. These apexes can be sharp, rounded or flattened or truncated. For example, the ridges can be rounded to a radius in a range of about 4 to about 7 to about 15 micrometers. The spacing between prism peaks (or pitch) can be about 5 to about 300 microns. The prisms can be arranged in various patterns such as described in U.S. Pat. No. 7,074,463 (Jones et al.).

The pitch of the structures of a brightness enhancing film is preferably 1 millimeter or less, more preferably from 10 microns to 100 microns and still more preferably from 17 microns to 50 microns. A pitch of 50 microns has been found to work quite well. The preferred pitch will depend, in part, on the pixel pitch of a liquid crystal display or the parameters of some other optical application of the film. The prism pitch should be chosen to help minimize moire interference.

In optical devices of the invention using thin brightness enhancing films, the pitch is preferably about 10 to about 36 microns, and more preferably about 17 to about 24 microns. This corresponds to prism heights of preferably about 5 to about 18 microns, and more preferably about 9 to about 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to about 1 mil (about 20 to about 35 microns), a typical ratio of prism height to total thickness is generally between about 0.2 and about 0.4. In other embodiments, thicker BEF materials will be used, BEF materials a 50 micron pitch and 25 micron thickness.

In one illustrative embodiment, the present invention provides reflective polarizers that exhibit significant haze and antistatic properties, resistance to scratching, and will not wet out against glare polarizers, making them well suited for use as the top sheet in film stacks.

As will be understood by those skilled in the art, optical devices of the invention may be made using other kinds of optical layers or other embodiments of MOF, BEF, or DRPF materials than those illustrative examples discussed above.

Antistatic Layer

The antistatic layer comprises the reaction product of a reaction mixture comprising (a) at least one polymerizable onium salt and (b) at least one polymerizable non-onium silicone or perfluoropolyether-moeity containing monomer, oligomer, or polymer. Applicants have discovered that such compositions provide surprising synergistic results. In some embodiments, the antistatic layer comprises the reaction product of a reaction mixture further comprising (c) a polymerizable non-onium, non-silicone monomer, oligomer, or polymer, e.g., an acrylate.

Although various antistatic agents can provide static decay times (as measured according to the test method described in the examples) in about 2 to about 10 seconds, it has been found that only certain kinds and amounts of antistatic agents can provide static decay times of less about 1.5 seconds. Antistatic layers of the invention will typically exhibit static decay times of less than about 10 seconds, and advantageously in preferred embodiments can provide static decay times of no greater than 0.5, 0.4, 0.3, 0.2, or 0.1 seconds.

An illustrative polymerizable salt useful herein is a polymerizable ionic liquid comprising a polymerizable salt whose melting point ($T_m$) is below about 100° C. The cation, the anion, or both may be polymerizable. The melting point of these compounds is more preferably below about 60° C., and most preferably below about 25° C., for ease of use in coatings with or without the aid of solvent carriers in the coating formulation.

Suitable onium salts can be selected from the group consisting of: ammonium salts, sulfonium salts, phosphonium salts, pyridinium salts, and imadazolium salts.

A preferred onium salt for use in the present invention has the formula:

$$(R^1)_{a-b}G^+[(CH_2)_q DR^2]_b X^- \qquad (I)$$

wherein
each $R^1$ comprises independently an alkyl, alicyclic, aryl, alkalicyclic, alkaryl, alicyclicalkyl, aralicyclic, or alicyclicaryl moiety, wherein such moieties may comprises one or more heteroatoms such as for example, nitrogen, oxygen, or sulfur, or may comprise phosphorus, or a halogen (and thus can be fluoroorganic in nature), $R^1$ may be cyclic or aromatic and may include $G^+$ in the cycle;
G is nitrogen, sulfur or phosphorous;
a is 3 where G is sulfur and a is 4 where G is nitrogen or phosphorous then;
b is an integer of 1 to 3 where G is sulfur and b is an integer of 1 to 4 where G is nitrogen or phosphorous;
q is an integer from 1 to 4;
D is oxygen, sulfur, or NR wherein R is H or a lower alkyl of 1 to 4 carbon atoms;
$R^2$ is a (meth)acryl; and
$X^-$ is an anion, preferably an organic anion, and more preferably a fluoroorganic anion.

In some embodiments, in which $G^+$ is included in the cycle, the onium salt has one of the following formulas:

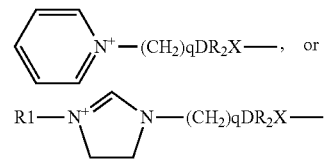

The onium salt may be present in the layer at a weight percentage of 1 to 99.95%, preferably 10 to 60%, more preferably 30 to 50%. The acryl functional oniums are preferred over the methacryl oniums because they exhibit a faster and greater degree of cure.

Illustrative examples of anions useful herein include alkyl sulfates, methane sulfonates, tosylates, fluoroorganics, fluoroinorganics, and halides.

Preferably the anion is a fluorochemical anion. Some illustrative examples include —C(SO$_2$CF$_3$)$_3$, —O$_3$SCF$_3$, —O$_3$SC$_4$F$_9$, and —N(SO$_2$CF$_3$)$_2$. Due to availability and cost the following are often preferred: —O$_3$SCF$_3$, —O$_3$SC$_4$F$_9$, and —N(SO$_2$CF$_3$)$_2$. Typically —N(SO$_2$CF$_3$)$_2$ is most preferred because it provides a broader range of solubility than some of the alternatives, making compositions containing it somewhat easier prepare and use.

Representative examples of weakly coordinating fluoroorganic anions useful herein include such anions as fluorinated arylsulfonates, perfluoroalkanesulfonates, cyanoperfluoroalkanesulfonylamides, bis(cyano) perfluoroalkanesulfonylmethides, bis(perfluoroalkanesulfonyl)imides, cyano-bis(perfluoroalkanesulfonyl)methides, bis(perfluoroalkanesulfonyl)methides, and tris(perfluoroalkanesulfonyl)methides; and the like.

Illustrative examples of suitable weakly coordinating fluoroorganic anions include the following:

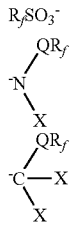

wherein each R$_f$ is independently a fluorinated alkyl or aryl group that may be cyclic or acyclic, saturated or unsaturated, and may optionally contain catenated ("in-chain") or terminal heteroatoms such as N, O, and S (e.g., —SF$_4$— or —SF$_5$). Q is independently an SO$_2$ or a CO linking group and X is selected from the group QR$_f$, CN, halogen, H, alkyl, aryl, Q-alkyl, and Q-aryl. Any two contiguous R$_f$ groups may be linked to form a ring. Preferably, R$_f$ is a perfluoroalkyl group, Q is SO$_2$ and each X is QR$_f$.

If fluoroorganic anions are used, they can be either fully fluorinated, that is perfluorinated, or partially fluorinated (within the organic portion thereof) as desired. Preferred fluoroorganic anions include those that comprise at least one highly fluorinated alkanesulfonyl group, that is, a perfluoroalkanesulfonyl group or a partially fluorinated alkanesulfonyl group wherein all non-fluorine carbon-bonded substituents are bonded to carbon atoms other than the carbon atom that is directly bonded to the sulfonyl group (preferably, all non-fluorine carbon-bonded substituents are bonded to carbon atoms that are more than two carbon atoms away from the sulfonyl group).

Preferably, the fluoroorganic anion is at least about 80% fluorinated (that is, at least about 80% of the carbon-bonded substituents of the anion are fluorine atoms). More preferably, the anion is perfluorinated (that is, fully fluorinated, where all of the carbon-bonded substituents are fluorine atoms). The anions, including the preferred perfluorinated anions, can contain one or more catenated (that is, in-chain) or terminal heteroatoms such as, for example, nitrogen, oxygen, or sulfur (e.g., —SF$_4$— or —SF$_5$).

Preferred anions for blend compositions and applications include organic and fluoroorganic anions (more preferably, perfluoroalkanesulfonates, fluoroorganic anions with two or three sulfonate groups, bis(perfluoroalkanesulfonyl)imides, and tris(perfluoroalkanesulfonyl)methides; most preferably, perfluoroalkanesulfonates and bis(perfluoroalkanesulfonyl)imides). Preferred anions for some embodiments are perfluorinated where all X's are QR$_f$ and all Q's are SO$_2$, more preferably the anion is a perfluoroalkanesulfonate or a bis(perfluoroalkanesulfonyl)imide, most preferably the anion is a bis(perfluoroalkanesulfonyl)imide.

The fluoroorganic ions provide greater solubility and compatibility of the onium salt with the non-onium polymerizable monomers, oligomers, or polymers. This important in providing a layer with good clarity, and good ion mobility which can improve the antistatic performance of the layer. Preferred anions include —C(SO$_2$CF$_3$)$_3$, —O$_3$SCF$_3$, —O$_3$SC$_4$F$_9$, and —N(SO$_2$CF$_3$)$_2$. More preferred anions, due to availability and cost are —O$_3$SCF$_3$, —O$_3$SC$_4$F$_9$, and —N(SO$_2$CF$_3$)$_2$, while the most preferred anion is —N(SO$_2$CF$_3$)$_2$.

Illustrative examples of polymerizable silicone monomers, oligomers, and polymers can be obtained from Degussa under the TEGO® Rad group of products. Especially useful polymerizable silicones are acrylate functional silicone polyethers, like TEGO™ Rad 2250.

In some embodiments, antistat layers of the invention will be made using polymerizable perfluoropolyether moiety-containing monomers, oligomers, or polymers, either instead of or in addition to the polymerizable silicone monomers, oligomers, and polymers discussed above. U.S. Patent Appln. Publn. 2006/0216500A1 (Klun et al.) discloses the synthesis of perfluoropolyether moiety-containing urethane acrylates useful herein. One class of suitable materials includes perfluoropolyether urethanes having a monovalent perfluoropolyether moiety and a multi-acrylate terminal group combined with a conventional hydrocarbon-based (more preferably acrylate-based) hard coat material, e.g., having the following formula (II):

(II)

wherein R$^i$ is a residue of a multi-isocyanate;

B is O, S or NR, where R is H or lower alkyl of 1 to 4 carbon atoms;

R$^f$ is a monovalent perfluoropolyether moiety composed of groups comprising the formula F(R$^{fc}$O)$_x$C$_d$F$_{2d}$—, wherein each R$^{fc}$ independently represents a fluorinated alkylene group having from 1 to 6 carbon atoms, each x independently represents an integer greater than or equal to 2, and wherein d is an integer from 1 to 6;

Q' is independently a connecting group of valency at least 2;

A is a (meth)acryl functional group —XC(O)C(R$_2$)=CH$_2$, where R$^2$ is a lower alkyl of 1 to 4 carbon atoms or H or F;

m is at least 1;

n is at least 1;

p is 2 to 6;

m+n is 2 to 10;

and in which each unit referred to by the subscripts m and n is attached to an R$^i$ unit.

Q' can be a straight or branched chain or cycle-containing connecting group. Q' can include a covalent bond, an alkylene, an arylene, an aralkylene, an alkarylene. Q' can optionally include heteroatoms such as O, N, and S, and combinations thereof. Q' can also optionally include a heteroatom-containing functional group such as carbonyl or sulfonyl, and combinations thereof.

U.S. Patent Appln. Publn. No. 2008-0124555 (Klun et al.) discloses perfluoropolyether moiety containing urethane acrylates containing poly(ethylene oxide) moieties case that would be useful herein. PCT WO2009/029438 (Pokorny et al.) discloses curable silicones with perfluoropolyether moiety containing urethane acrylates that would be useful herein.

As will be known to those skilled in the art, surface matte coatings are often useful in optical films and it may be desired to impart such matte properties to antistatic coatings of the invention. The increased haze and reduced clarity from a matte coating helps provide a more uniform display, and hide optical defects from the underlying film stack and backlight, especially in liquid crystal displays (LCDs). Various means are available to provide a matte coating and are useful with the present invention.

A multiphase coating can have a matte surface structure generated from immiscible materials incorporated in the coating at the surface or within the bulk of the coating, e.g., entrainment of particles such as polymethylmethacrylate beads in the coating. In some embodiments, particles with different refractive index from the bulk of the coating can be used to impart desired haze properties without necessarily yielding a matte surface. Though useful particles can be of any shape, typically preferred particle shapes are often in the form of spherical or oblong beads. Preferable particle sizes are generally about 0.1 microns to about 20 microns in average diameter. Particles can be made from any material that is compatible with the coating. Some illustrative examples of suitable materials for particles include polymethylmethacrylate, polybutlylmethacrylate, polystyrene, polyurethane, polyamide, polysilicone, and silica. Useful particles can be obtained from Ganz Chemical, Sekisui Plastics Co., Ltd., and Soken Chemical & Engineering Co., Ltd.

The onium salt, polymerizable silicone and/or perfluoropolyether content, and other components, if any, should be compatible in that they will mix and polymerize to form transparent films.

In addition to the onium salt and polymerizable silicone and/or perfluoropolyether moiety-containing components described above, antistat layers of the invention can be made from curable compositions further comprising polymerizable non-silicone, non-perfluoropolyether monomers, oligomers, or polymers. Such materials might be used to modify properties of the resultant layer, e.g., adhesion to the optical film, flexibility, or other mechanical properties, optical properties, e.g., its haze, clarity, etc.; reduce cost, etc.

Some illustrative examples of polymerizable non-silicone, non-onium monomers, oligomers, or polymers useful herein include, for example, poly (meth)acryl monomers selected from the group consisting of (a) mono(methacryl) containing compounds such as phenoxyethyl acrylate, ethoxylated phenoxyethyl acrylate, 2-ethoxyethoxyethyl acrylate, ethoxylated tetrahydrofurfural acrylate, and caprolactone acrylate, (b) di(meth)acryl containing compounds such as 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated (10) bisphenol A diacrylate, ethoxylated (3) bisphenol A diacrylate, ethoxylated (30) bisphenol A diacrylate, ethoxylated (4) bisphenol A diacrylate, hydroxypivalaldehyde modified trimethylolpropane diacrylate, neopentyl glycol diacrylate, polyethylene glycol (200) diacrylate, polyethylene glycol (400) diacrylate, polyethylene glycol (600) diacrylate, propoxylated neopentyl glycol diacrylate, tetraethylene glycol diacrylate, tricyclodecanedimethanol diacrylate, triethylene glycol diacrylate, tripropylene glycol diacrylate; (c) tri(meth)acryl containing compounds such as glycerol triacrylate, trimethylolpropane triacrylate, pentaerthyritol triacrylate, ethoxylated triacrylates (e.g., ethoxylated (3) trimethylolpropane triacrylate, ethoxylated (6) trimethylolpropane triacrylate, ethoxylated (9) trimethylolpropane triacrylate, ethoxylated (20) trimethylolpropane triacrylate), propoxylated triacrylates (e.g., propoxylated (3) glyceryl triacrylate, propoxylated (5.5) glyceryl triacrylate, propoxylated (3) trimethylolpropane triacrylate, propoxylated (6) trimethylolpropane triacrylate), trimethylolpropane triacrylate, tris(2-hydroxyethyl)isocyanurate triacrylate; (d) higher functionality (meth)acryl containing compounds such as pentaerythritol tetraacrylate, ditrimethylolpropane tetraacrylate, dipentaerythritol pentaacrylate, ethoxylated (4) pentaerythritol tetraacrylate, caprolactone modified dipentaerythritol hexaacrylate; (e) oligomeric (meth)acryl compounds such as, for example, urethane acrylates, polyester acrylates, epoxy acrylates; polyacrylamide analogues of the foregoing; and combinations thereof. Such compounds are widely available from vendors such as, for example, Sartomer Company; UCB Chemicals Corporation; Cytec Corporation, Cognis, and Aldrich Chemical Company. Additional useful (meth)acrylate materials include hydantoin moiety-containing poly(meth)acrylates, for example, as described in U.S. Pat. No. 4,262,072 (Wendling et al.).

Outer layer antistatic coatings on brightness enhancement films should impart minimal absorbance and color, so as not to interfere with brightness enhancement properties of the films. The coatings may increase haze and reduce clarity to provide a uniform display, and hide optical defects from the underlying film stack and backlight. They should provide reasonable durability.

In perhaps the simplest embodiments, devices of the invention will comprise an optical layer with antistat layer as described herein on one surface thereof. As shown in FIG. 1 wherein optical layer 12 is a simple polyester film having antistatic layer 14 on surface 16 thereof and optional adhesive 18 on opposite side 20. This construction may be used for appropriate applications and if desired may be may adhered to desired substrates, e.g., with optional adhesive 18 or by direct lamination of surface 20 if suitable. In some embodiments, the optical device might comprise antistat layers of the invention on each surface of an optical layer or optical device, e.g., DBEF-II, wherein the antistat layers may be the same or may be optimized independently, e.g., PMMA beads in one antistat layer but not the other, etc.

In some embodiments, the antistatic layer will be formed on the optical layer by the following method: (1) providing a liquid coating composition comprising (a) at least one polymerizable onium salt as described herein, (b) at least one non-onium polymerizable silicone or perfluoropolyether moiety-containing monomer, oligomer, or polymer as described herein, and optionally (c) at least one non-silicone, non-perfluoropolyether monomer, oligomer, or polymer; (2) applying the liquid coating composition to the surface of an optical layer; and (3) curing the liquid coating composition in situ to form the antistatic layer on the surface of the optical layer. In other embodiments, the antistatic layer will be formed on one side of a substrate film, e.g., a polyester film, the other side of which is subsequently positioned on the surface of an optical film, e.g., adhered by lamination or with adhesive, or held in place with mechanical means.

EXAMPLES

The invention will be explained with reference to the following illustrative examples. All amounts are in parts by weight or percent by weight unless otherwise indicated.

Test Methods: Average static decay was determined using the following method. Sheets of test materials were cut into 12 cm by 15 cm samples and conditioned at relative humidity (RH) of about 50% for at least 12 hours. The materials were tested at temperatures that ranged from 22 to 25° C. The static charge dissipation time was measured according to MIL-STD 3010, Method 4046, formerly known as the Federal Test Method Standard 10113, Method 4046, "Antistatic Properties of Materials", using an ETS Model 406D Static Decay Test Unit (manufactured by Electro-Tech Systems, Inc.). This apparatus induces an initial static charge (Average Induced Electrostatic Charge) on the surface of the flat test material by using high voltage (5000 volts), and a field meter allows observation of the decay time of the surface voltage from 5000 volts (or whatever the induced electrostatic charge was) to 10 percent of the initial induced charge. This is the static charge dissipation time. The lower the static charge dissipation time, the better the antistatic properties are of the test material. All reported values of the static charge dissipation times in this invention are averages (Average Static Decay Rate) over at least 3 separate determinations. Values reported as >60 seconds indicate that the sample tested has an initial static charge that cannot be removed by surface conduction and is not antistatic. When the sample tested did not accept a charge of about 3000 volts or more, it was not considered to have charged sufficiently to be antistatic.

Materials

DBEF Film (Optical Layer): In most of the following examples, VIKUITI™ Dual Brightness Enhancement Film II (or DBEF II) from 3M was used as the optical film. Such films can be produced as follows:

A multilayer reflective polarizer film was constructed with first optical layers created from a polyethylene naphthalate and second optical layers created from co(polyethylene naphthalate) and skin layers or non-optical layers created from a cycloaliphatic polyester/polycarbonate blend commercially available from Eastman Chemical Company under the tradename "VM365" and additionally blended with Styrene-Acrylate copolymer "NAS30" available from NOVA Chemicals.

The copolyethylene-hexamethylene naphthalate polymer (CoPEN5050HH) used to form the first optical layers is synthesized in a batch reactor with the following raw material charge: dimethyl 2,6-naphthalenedicarboxylate (80.9 kg), dimethyl terephthalate (64.1 kg), 1,6-hexane diol (15.45 kg), ethylene glycol (75.4 kg), trimethylol propane (2 kg), cobalt (II) acetate (25 g), zinc acetate (40 g), and antimony (III) acetate (60 g). The mixture was heated to a temperature of 254° C. at a pressure of two atmospheres ($2\times10^5$ $N/m^2$) and the mixture was allowed to react while removing the methanol reaction product. After completing the reaction and removing the methanol (approximately 42.4 kg) the reaction vessel was charged with triethyl phosphonoacetate (55 g) and the pressure was reduced to one torr (263 $N/m^2$) while heating to 290° C. The condensation by-product, ethylene glycol, was continuously removed until a polymer with intrinsic viscosity 0.55 dl/g as measured in a 60/40 weight percent mixture of phenol and o-dichlorobenzene is produced. The CoPEN5050HH polymer produced by this method had a glass transition temperature ($T_g$) of 85° C. as measured by differential scanning calorimetry at a temperature ramp rate of 20° C./minute. The CoPEN5050HH polymer had a refractive index of 1.601 at 632 nm.

The above described PEN and CoPEN5050HH were coextruded through a multilayer melt manifold to create a multilayer optical film with 275 alternating first and second optical layers. This 275 layer multi-layer stack was divided into 3 parts and stacked to form 825 layers. The PEN layers were the first optical layers and the CoPEN5050HH layers were the second optical layers. In addition to the first and second optical layers, two sets of skin layers were coextruded on the outer side of the optical layers through additional melt ports. VM365 blended with 22 wt % NAs30 was used to form the external set of skin layers. The construction was, therefore, in order of layers: VM365/NAS30 blend outer skin layer, 825 alternating layers of optical layers one and two, VM365/NAS30 blend outer skin layer.

The multilayer extruded film was cast onto a chill roll at 5 meters/minute (15 feet/minute) and heated in an oven at 150° C. (302° F.) for 30 seconds, and then uniaxially oriented at a 5.5:1 draw ratio. A reflective polarizer film of approximately 150 microns (8 mils) thickness was produced.

This multilayer film was measured to have a haze level of 42% as measured with a Gardner haze meter. This multilayer film when exposed to the thermal shock test (warp test) had an acceptable level of warp after 100 hrs of thermal cycling from −35° C. to 85° C.

Coating Components for Antistatic Layer: The following raw materials were used to make coating compositions to form antistatic layers in the examples:

Solvent: methanol;
Photoinitiator: ESACURE™ One, polymeric hydroxy ketone from Sartomer Company;

Photoinitiator: DAROCUR™ 4265, 50:50 blend of hydroxy ketone and diphenyl phosphine oxide from Ciba Specialty Chemicals;

Photoinitiator: IRGACURE™ 819 from Ciba Specialty Chemicals;

Multifunctional acrylate: SARTOMER™ SR-355, ditrimethylolpropane tetraacrylate;

Multifunctional acrylate: SARTOMER™ SR-494, ethoxylated pentaerythritol tetraacrylate;

Multifunctional acrylate: SARTOMER™ SR-9041, pentaacrylate ester;

Multifunctional acrylate: SARTOMER™ SR-238b, hexanediol diacrylate:

Quaternary ammonium salt acrylate: AGEFLEX™ FA1Q80MC*500 (N-acryloyloxyethyl-N,N,N-trimethylammonium chloride, $(CH_3)_3NCH_2CH_2OC(O)CH=CH_2^+Cl^-$ from Ciba)

HFPOC(O)N(H)CH$_2$CH$_2$OH having of number weight molecular weight of 1344 was made according a procedure similar to that described in U.S. Patent Appln. Pubn. No. 2004-0077775 (Audenaert et al.) with the exception that HFPO methyl ester $F(CF(CF_3)CF_2O)_a CF(CF_3)C(O)CH_3$ with a=6.2 was replaced with $F(CF(CF_3)CF_2O)_a CF(CF_3)C(O)CH_3$ wherein a=6.85. The methyl ester material for preparation of the alcohol can be prepared according to the method reported in U.S. Pat. No. 3,250,808 (Moore et al.) with purification by fractional distillation;

Polyisocyanate referred to herein as "Des N100" was obtained from Bayer Polymers LLC. under the trade designation "Desmodur™ N100";

2,6-di-t-butyl-4-methylphenol (BHT), and dibutyltin dilaurate (DBTDL) are available from Sigma Aldrich;

Pentaerythritol triacrylate ("PET3A"), under the trade designation "SR444C", was obtained from Sartomer Company;

CARBOWAX™ MPEG 750 was obtained from Dow Chemical Co.;

Polymerizable silicone: as indicated, TEGO™ RAD 2250, TEGO™ RAD 2300, TEGO™ RAD 2700, and TEGO™ RAD 2200N, acrylate functional silicone polyether, formerly available from Degussa, now the Chemicals Business Area of Evonik Industries;

Beads: SOKEN™ TS3SC Acrylic Powder, 3 micron polymethylmethacrylate beads;

Polymerizable Onium salt 1 (POS-1), i.e., $(CH_3)_3NCH_2CH_2OC(O)CH=CH_2^{+-}N(SO_2CF_3)_2$, -(Acryloyloxyethyl)-N,N,N-trimethylammonium bis(trifluoromethanesulfonyl)imide

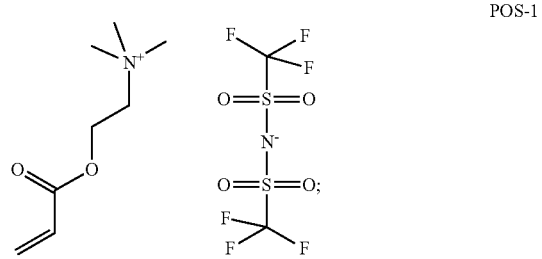

POS-1 was prepared as follows:

To a tared 5 L, 3-necked round bottom flask equipped with overhead stirrer was charged 1486 g (79.1% solids in water, 6.069 mol) AGEFLEX™ FA1Q80MC*500 and the contents were heated to 40° C. To the flask was added, over about one minute, 2177.33 g (80% solids in water, 6.069 mol) HQ-115, followed by 597.6 g deionized water. After stirring for 1 hour, the reaction was transferred to a separatory funnel and the lower organic layer (2688.7 g) was returned to the reaction flask and washed with 1486 g deionized water at 40° C. for 30 min. The lower layer (2656.5 g) was again separated from the aqueous layer and placed in a dry 5 L, 3-necked round bottom equipped with overhead stirrer and stillhead, and air bubbler. To the flask was added 2000 g acetone and the reaction was distilled at atmospheric pressure over 6 hours with an air sparge to azeotropically dry the product with a yield of 2591 g of a clear liquid, which slowly crystallizes to a solid;

Polymerizable Onium Salt 2 (POS-2): represented by the following formula was prepared as follows:

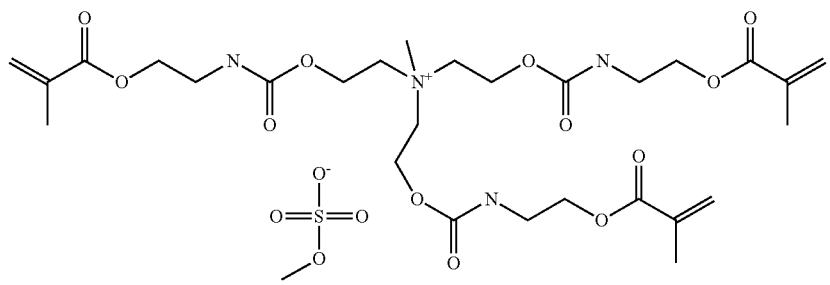

PIL-2.

To a solution of tris-(2-hydroxyethyl)methylammonium methylsulfate (11.58 g, 0.04 mol, available from BASF), isocyanatoethyl methacrylate (19.58 g, 0.12 mol), and 2,6-di-tert-butyl-4-methylphenol (BHT, 0.020 g), both available from Aldrich in methylene chloride (50 mL) in a flask fitted with a drying tube and a magnetic stirrer was added a drop of dibutyltin dilaurate. The solution was cooled in an ice bath and stirred for 3 hours, then allowed to warm to room temperature and stirring was continued for another 36 hours. Progress of the reaction was monitored by infrared spectroscopy, observing the disappearance of the isocyanate absorption. When reaction was complete the solvent was removed at reduced pressure yielding a very viscous liquid.

PFPE UA1: A perfluoropolyether-moiety containing urethane multiacrylate, (DES N100/0.20 HFPOC(O)NHCH$_2$CH$_2$OH/0.35 PET$_3$A/0.5 MPEG 750) was prepared as follows: a 500 mL round bottom flask equipped with a stirbar was charged with 15.00 g (EW 191, 0.0785 eq, 1.0 mole fraction) DES N100 and 64 g methyl ethyl ketone (MEK), and placed in an oil bath at 55° C. Next the reaction was charged with 140 microliters of a 10% solution of DBTDL in MEK, followed by 21.11 g (MW 1344, 0.0157 eq, 0.2 mol fraction) HFPOC(O)NHCH$_2$CH$_2$OH via addition funnel over 10 min. The funnel was rinsed with 5 g of MEK. After 2 hours from the start of the addition of the HFPOC(O)NHCH$_2$CH$_2$OH, 29.45 g (0.0393 eq, 0.5 mol fraction) molten MPEG 750, diluted with 5 g MEK was added to the reaction via dropping funnel over about 5 min. After 4 hours from the start of the addition of the HFPOC(O)NHCH$_2$CH$_2$OH, 13.59 g (494.3 EW, 0.0275 eq, 0.35 mol fraction) PET$_3$A, 0.0396 g BHT and about 5 g of MEK was added to the reaction. After reaction overnight, FTIR showed a small isocyanate peak. 3.1 g additional PET3A was added, and after about 8 hours, the reaction was complete, and was adjusted to 50% solids with MEK; and PFPE UA2: A perfluoropolyether-moiety containing urethane multiacrylate (DES N100/0.30 HFPOC(O)NHCH$_2$CH$_2$OH/0.35 PET$_3$A/0.5 MPEG 750) was prepared as follows: similar to PFPE UA1 except 31.66 g (MW 1344, 0.0236 eq, 0.3 mol fraction) HFPOC(O)NHCH$_2$CH$_2$OH, 29.45 g (0.0393 eq, 0.5 mol fraction) MPEG 750, 0.0449 g BHT, and 13.59 g (494.3 EW, 0.0275 eq, 0.35 mol fraction) PET$_3$A.

Examples 1 to 9

Nine polymerizable beaded matte coating formulations were prepared, coated on DBEF-II described above, dried, cured, and tested. These formulations all contained 82% methanol, 1.9% TS3SC 3 micron PMMA beads, and 0.16% ESACURE™ One. Otherwise, they varied as shown in Table 1 below. Each formulation was mixed to ensure the soluble components were dissolved and the beads were dispersed. Each formulation was coated onto the back side of DBEF-II with a #8 wire wound Meyer rod, to give an average dry thickness of about 1.6 microns. Each coating was dried for 2 minutes in a batch oven at 60° C. (140° F.), and then UV cured in a nitrogen environment with one pass at 10.7 meters/minute (35 feet/minute), under a Fusion F600 Microwave driven medium pressure lamp using a D bulb, from Fusion UV Systems Inc. At a speed of 10.7 meters/minute, the UV energy emitted is as follows: UVA 460 mJ/cm$^2$, UVB 87 mJ/cm$^2$, UVC 12 mJ/cm$^2$, UVV 220 mJ/cm$^2$. All the coatings provided good haze and surface matte features without interfering with the brightness enhancement properties of the DBEF-II film. The formulations and static decay results are as shown in Table 1.

The results in Table 1 show the surprising and dramatic improvement of antistatic properties, in particular the surprising synergy which can be attained herein.

TABLE 1

| Example | POS-1 (wt %) | Polymerizable silicone TEGO ™ Rad 2250 (wt %) | SR-355 (wt %) | SR-494 (wt %) | Avg Static Decay (Seconds) |
|---|---|---|---|---|---|
| Comparative 1 | 6.4 | 0 | 0 | 9.6 | * |
| Comparative 2 | 11.2 | 0 | 2.4 | 2.4 | 17.0 |
| Comparative 3 | 1.6 | 0 | 7.2 | 7.2 | * |
| Comparative 4 | 6.4 | 0 | 9.6 | 0 | * |
| Example 5 | 6.3 | 0.18 | 0 | 9.5 | 1.5 |
| Example 6 | 11.0 | 0.18 | 2.4 | 2.4 | 1.2 |
| Example 7 | 1.6 | 0.18 | 7.1 | 7.1 | 6.2 |
| Example 8 | 6.3 | 0.18 | 9.5 | 0 | 8.2 |
| Comparative 9 | 0 | 0.18 | 16.0 | 0 | * |

*This product was not conductive, no charge was possible.

Examples 10 to 13

Coating formulations for examples 10 to 13 were mixed as 100% solid formulations (no solvent) to include POS-1 with an indicated polymerizable silicone acrylates or a polymerizable perfluoropolyether as per the following general formulation. No beads were included in these compositions.

55 parts by weight SR 9041 (pentaacrylate ester from Sartomer);
20 parts SR 238b (HDDA, i.e., 1,6 hexanediol diacrylate from Sartomer);
25 parts POS-1;
2 parts (of total weight) curable silicone or curable perfluorpolyether (PFPE) as indicated in Table 2; and
0.5 parts (of total weight) IRGACURE™ 819.

The formulations were then coated at room temperature onto 5 mil primed PET film using a lab scale multi-roll coater to a final thickness of approximately 3 microns. Coating thickness was carefully controlled by uniformly metering known volume of coating formulation across prescribed coating area on PET film. The coated film sample was heated to 60° C. for 1 minute and then UV cured in a nitrogen environment with one pass at 9.1 meters/minute (30 feet/minute), under a Fusion UV D bulb, from Fusion UV Systems, Inc. The final coating were all clear and smooth coatings well adhered to the PET film substrate. Each sample was equilibrated in a constant temperature and humidity room at 22° C. and 50% relative humidity for 12 hours just prior to measuring charge decay. Charge decay values for each formulation is documented in Table 2 below showing the results obtained with several different non-onium polymerizable materials.

TABLE 2

| Example | Silicone or PFPE | Charge decay (seconds) |
|---|---|---|
| Example 10 | PFPE UA 1 | 5.2 |
| Example 11 | TEGO ™ Rad 2200N | 6.1 |
| Example 12 | TEGO ™ Rad 2300 | 0.5 |
| Example 13 | TEGO ™ Rad 2250 | 2.1 |

Examples 14 to 16

Three polymerizable clear coating formulations were prepared, coated on DBEF-II, dried, cured, and tested. These formulations all contained 85% methanol and 0.15% CIBA™ DAROCUR™ 4265 curing agent. Otherwise, they varied as shown in Table 3 below. Each formulation was mixed to ensure the soluble components were dissolved. Each formulation was coated onto the back side of DBEF-II with a #16 wire wound Meyer rod, to give an average dry thickness of about 3 microns. Each coating was dried for 2 minutes in a batch oven at 60° C. (140° F.), and then UV cured in a nitrogen environment with two passes at 10.7 meters/minute (35 feet/minute), under a Fusion F600 Microwave driven medium pressure lamp using a D bulb, from Fusion UV Systems Inc. At a speed of 10.7 meters/minute, the UV energy emitted is as follows: UVA 460 mJ/cm$^2$, UVB 87 mJ/cm$^2$, UVC 12 mJ/cm$^2$, UVV 220 mJ/cm$^2$. All the coatings provided a smooth clear coating layer without interfering with the brightness enhancement properties of the DBEF-II film.

The formulations and static decay results are as shown in Table 3 wherein is seen the surprising and dramatic improvement of antistatic properties in a polymerizable clear coating from the combination of a polymerizable onium ionic liquid, and a polymerizable silicone.

TABLE 3

| Example | POS-1 (wt %) | POS-2 (wt %) | Polymerizable silicone TEGO™ Rad 2250 (wt %) | Avg Static Decay (Seconds) |
|---|---|---|---|---|
| Comparative 14 | 0 | 14.9 | 0 | 4.8 |
| Example 15 | 0 | 14.7 | 0.18 | 2.0 |
| Example 16 | 7.3 | 7.3 | 0.18 | 0.04 |

Example 17

A polymerizable clear coating formulation was prepared, coated on DBEF-II, dried, cured, and tested. The formulation contained 85% methanol and 0.15% CIBA™ DAROCUR™ 4265 curing agent. The other components are shown in Table 4 below. The formulation was mixed to ensure the soluble components were dissolved. The formulation was coated onto the back side of DBEF-II with a #8 wire wound Meyer rod, to give an average dry thickness of about 1.6 microns. The coating was dried for 2 minutes in a batch oven at 60° C. (140° F.), and then UV cured in a nitrogen environment with two passes at 10.7 meters/minute (35 feet/minute), under a Fusion F600 Microwave driven medium pressure lamp using a D bulb, from Fusion UV Systems Inc. At a speed of 10.7 meters/minute, the UV energy emitted is as follows: UVA 460 mJ/cm$^2$, UVB 87 mJ/cm$^2$, UVC 12 mJ/cm$^2$, UVV 220 mJ/cm$^2$. The coating provided a smooth clear coating layer without interfering with the brightness enhancement properties of the DBEF-II film.

The formulation and static decay results are shown in Table 4 wherein is seen the surprising and dramatic improvement of antistatic properties in a polymerizable clear coating from the combination of a polymerizable onium ionic liquid, and a polymerizable perfluorpolyether.

TABLE 4

| Example | POS-1 (wt %) | PFPE UA2 (wt %) | SR-494 (wt %) | Avg Static Decay (Seconds) |
|---|---|---|---|---|
| Example 17 | 7.3 | 0.3 | 7.3 | 6.6 |

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention.

The patents and patent applications cited herein are all incorporated by reference in their entirety.

What is claimed is:

1. An optical device comprising at least one optical layer and at least one antistatic layer disposed on at least one surface of said at least one optical layer wherein said at least one antistatic layer comprises the reaction product of a reaction mixture comprising:
   (a) 30 to 50 weight percent of at least one polymerizable ionic liquid onium salt which is a (meth)acryl functional quaternary ammonium salt having a melting point ($T_m$) below 100° C. and comprising an anion selected from the group consisting of alkyl sulfates, methane sulfonates, tosylates, —C(SO$_2$CF$_3$)$_3$, —O$_3$SCF$_3$, -O$_3$SC$_4$F$_9$, and —N(SO$_2$CF$_3$)$_2$; and
   (b) at least one non-onium acrylate functional silicone polyether,
   wherein the reaction mixture comprises 1.1 to 1.95 weight percent of the at least one non-onium acrylate functional silicone polyether.

2. An optical device comprising at least one optical layer and at least one antistatic layer disposed on at least one surface of said at least one optical layer wherein said at least one antistatic layer comprises the reaction product of a reaction mixture comprising:
   (a) 9.9 to 98 weight percent of at least one polymerizable ionic liquid onium salt which is a (meth)acryl functional quaternary ammonium salt having a melting point ($T_m$) below 100° C. and comprising an anion selected from the group consisting of alkyl sulfates, methane sulfonates, tosylates, —C(SO$_2$CF$_3$)$_3$, —O$_3$SCF$_3$, -O$_3$SC$_4$F$_9$, and —N(SO$_2$CF$_3$)$_2$; and
   (b) at least one non-onium acrylate functional silicone polyether;
   wherein said at least one optical layer is selected from the group consisting of reflective polarizers, brightness enhancement films, and diffuse reflecting polarizing films, and
   wherein the reaction mixture comprises 1.1 to 1.95 weight percent of the at least one non-onium acrylate functional silicone polyether.

* * * * *